US010520355B1

(12) United States Patent
Han et al.

(10) Patent No.: US 10,520,355 B1
(45) Date of Patent: *Dec. 31, 2019

(54) FIBER-OPTIC TEMPERATURE AND FLOW SENSOR SYSTEM AND METHODS

(71) Applicants: NUtech Ventures, Inc., Lincoln, NE (US); The United States of America, as represented by the Secretary of the Navy, Arlington, VA (US)

(72) Inventors: Ming Han, Lincoln, NE (US); Guigen Liu, Lincoln, NE (US); Weilin Hou, Slidell, LA (US); Qiwen Sheng, Haslett, MI (US)

(73) Assignees: NUTECH VENTURES, Inc., Lincoln, NE (US); The United States of America, as represented by the Secretary of the Navy, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,326

(22) Filed: Mar. 13, 2018

Related U.S. Application Data (63) Continuation-in-part of application No. 15/155,773, filed on May 16, 2016, now Pat. No. 9,995,628.

(Continued)

(51) Int. Cl.
  *G01H 9/00* (2006.01)
  *G01K 11/32* (2006.01)
  (Continued)

(52) U.S. Cl.
  CPC ............ *G01H 9/004* (2013.01); *G01F 1/6884* (2013.01); *G01K 11/32* (2013.01); *G01K 13/02* (2013.01)

(58) Field of Classification Search
  CPC .......... G02B 6/29359; G01J 3/26; G01J 3/45; G01F 1/661; G01P 5/26
  See application file for complete search history.

(56) References Cited

U.S. PATENT DOCUMENTS

| | | | |
|---|---|---|---|
| 6,925,213 B2 * | 8/2005 | Boyd | G01D 5/268 385/12 |
| 9,995,628 B1 * | 6/2018 | Han | G01P 5/26 |

(Continued)

OTHER PUBLICATIONS

Bandyopadhyay et al., "Ultrahigh-temperature regenerated gratings in boron-codoped germanosilicate optical fiber using 193 nm", Optics Letters, vol. 33, No. 16, Aug. 15, 2008.

(Continued)

*Primary Examiner* — Michael A Lyons
(74) *Attorney, Agent, or Firm* — Greer, Burns & Crain, Ltd.; Steven P. Fallon (57) ABSTRACT

A fiber optic sensor, a process for utilizing a fiber optic sensor, and a process for fabricating a fiber optic sensor are described, where a double-side-polished silicon pillar is attached to an optical fiber tip and forms a Fabry-Pérot cavity. In an implementation, a fiber optic sensor in accordance with an exemplary embodiment includes an optical fiber configured to be coupled to a light source and a spectrometer; and a single silicon layer or multiple silicon layers disposed on an end face of the optical fiber, where each of the silicon layer(s) defines a Fabry-Pérot interferometer, and where the sensor head reflects light from the light source to the spectrometer. In some implementations, the fiber optic sensor may include the light source coupled to the optical fiber, a spectrometer coupled to the optical fiber, and a controller coupled to the high-speed spectrometer.

19 Claims, 10 Drawing Sheets

Related U.S. Application Data (60) Provisional application No. 62/161,730, filed on May 14, 2015.

(51) Int. Cl.
*G01K 13/02* (2006.01)
*G01F 1/688* (2006.01)

(56) References Cited

U.S. PATENT DOCUMENTS

2005/0151975 A1* 7/2005 Melnyk .................. G01B 11/18
356/480
2016/0025562 A1* 1/2016 Donlagic .............. G01J 3/0224
250/227.23

OTHER PUBLICATIONS

Berthold et al., "Reflective fiber optic temperature sensor using silicon thin film", Optical Engineering, vol. 30, No. 5, pp. 524-528, May 1991.
Born et al., "Principles of optics: Electromagnetic theory of propagation, interference and diffraction of light", Seventh (Expanded) Edition, Cambridge University Press, 1999.
Choi et al., "Cross-talk free and ultra-compact fiber optic sensor for simultaneous measurement of temperature and refractive index", Optics Express, vol. 18, No. 1, pp. 141-149, Jan. 4, 2010.
Choi et al., "Miniature fiber-optic high temperature sensor based on a hybrid structured Fabry-Perot interferometer", Optics Letters, vol. 33, No. 21, pp. 2455-2457, Nov. 1, 2008.
Cocorullo et al., "A Temperature All-Silicon Micro-Sensor Based on the Thermo-Optic Effect", IEEE Transactions on Electron Devices, vol. 44, No. 5, pp. 766-774, May 1997.
Coviello et al., "Thermally stabilized PCF-based sensor for temperature measurements up to 1000 degrees C", Optics Express, vol. 17, No. 24, pp. 21551-21559, Nov. 23, 2009.
Ding et al., "Fast-Response High-Temperature Microfiber Coupler Tip Thermometer", IEEE Photonics Technology Letters, vol. 24, No. 14, pp. 1209-1211, Jul. 15, 2012.
Guo et al., "High-sensitivity, high-frequency extrinsic Fabry-Perot interferometric fiber-tip sensor based on a thin silver diaphragm", Optics Letters, vol. 37, No. 9, pp. 1505-1507, May 1, 2012.
Hatta et al., "SMS Fibre Structure for Temperature Measurement Using a Simple Intensity-Based Interrogation System", Electronics Letters, vol. 45, No. 21, p. 1069, Oct. 8, 2009.
Hou, Ocean Sensing and Monitoring, Chapter 1: Oceanography Overview (SPIE Press, 2013).
Hou, Ocean Sensing and Monitoring, Chapter 2: Basic Optical Properties of the Ocean (SPIE Press, 2013).
Hou, Ocean Sensing and Monitoring, Chapter 3: Underwater Sensing: Diver Visibility (SPIE Press, 2013).
Hou et al, "A novel, high-resolution, high-speed, fiber-optic temperature sensor for oceanographic applications, Current, Waves and Turbulence Measurement (CWTM)," 2015 IEEE/OES Eleventh, 1-4.
Hou et al., "Optical turbulence on underwater image degradation in natural environments", Applied Optics, vol. 51, No. 14, pp. 2678-2686, May 10, 2012.
Islam et al., "Chronology of Fabry-Perot Interferometer Fiber-Optic Sensors and Their Applications: A Review", Sensors, vol. 14, pp. 7451-7488, 2014.
Kajanto et al., "A silicon-based fibre-optic temperature sensor", J. Phys. E: Sci. Instrum. vol. 21, pp. 652-656, 1988.
Khaliq et al., Enhanced sensitivity fibre optic long period grating temperature sensor, Measurement Science and Technology, vol. 13, pp. 792-795, Apr. 18, 2002.
Komma et al., "Thermo-optic coefficient of silicon at 1550 nm and cryogenic temperatures", Appl. Phys. Letters, vol. 101, 041905, 2012.
Lee et al., Interferometric Fiber Optic Sensors, Sensors, vol. 12, pp. 2467-2486, Feb. 23, 2012.
Li, "Refractive index of silicon and germanium and its wavelength and temperature derivatives", J. Phys. Chem. Ref. Data, vol. 9, No. 3, pp. 561-658, 1980.
Liu et al., "A miniature fiber-optic sensor for high-resolution and high-speed temperature sensing in ocean environment", Ocean Sensing and Monitoring VII, edited by Hou et al., Proc. of SPIE vol. 9459, 2015.
Liu et al., "High-resolution and fast-response fiber-optic temperature sensor using silicon Fabry-Perot cavity", Optics Express, vol. 23, No. 6, pp. 7237-7247, Mar. 23, 2015.
Liu et al., "Fast-response fiber-optic anemometer with temperature self-compensation", Optics Express, vol. 23, No. 10, pp. 13562-13570, May 18, 2015.
Liu et al., "Influence of fiber bending on wavelength demodulation of fiber-optic Fabry-Perot interferometric sensors", Optics Express, vol. 24, No. 23, pp. 26732-26744, Nov. 14, 2016.
Liu et al., "High-resolution, large dynamic range fiber-optic thermometer with cascaded Fabry-Perot cavities", Optics Letters, vol. 41, No. 21, pp. 5134-5137, Nov. 1, 2016.
Liu et al., "A fiber-optic water flow sensor based on laser-heated silicon Fabry-Perot cavity", Fiber Optic Sensors and Applications XIII, edited by Udd et al., Proc. of SPIE, vol. 9852, 2016.
Liu et al., "Fiber-optic gas pressure sensing with a laser-heated silicon-based Fabry-Perot interferometer", Optics Letters, vol. 40, No. 11, pp. 2461-2464, Jun. 1, 2015.
Liu et al., "Fiber-optic anemometer based on silicon Fabry-Perot interferometer", Fiber Optic Sensors and Applications XII, edited by Udd et al., Proc. of SPIE, vol. 9480, 2015.
Liu et al., "Optical fiber vector flow sensor based on a silicon Fabry-Perot interferometer array", Optics Letters, vol. 41, No. 20, pp. 4629-4632, Oct. 15, 2016.
Ozisik, "Heat Transfer: A Basic Approach", Chapter 8, McGraw-Hill, 1985.
Ozisik, "Heat Transfer: A Basic Approach", Chapter 9, McGraw-Hill, 1985.
Pinet, "Fabry-Perot Fiber-Optic Sensors for Physical Parameters Measurement in Challenging Conditions", Journal of Sensors, 720980, 2009.
Qu et al., "Heat transfer for water flow in trapezoidal silicon microchannels", International Journal of Heat and Mass Transfer, vol. 43, pp. 3925-3936, 2000.
Ran et al., "Laser-micromachined Fabry-Perot optical fiber tip sensor for high-resolution temperature-independent measurement of refractive index", Optics Express, vol. 16, No. 3, pp. 2252-2263, Feb. 4, 2008.
Rao, "In-fibre Bragg grating sensors", Mea. Sci. Technol., vol. 8, pp. 355-375, 1997.

* cited by examiner

FIBER-OPTIC TEMPERATURE AND FLOW SENSOR SYSTEM AND METHODS

CROSS-REFERENCE TO RELATED APPLICATIONS

The present application claims the benefit under 35 U.S.C. § 119(e) of U.S. Provisional Application Ser. No. 62/161,730, filed May 14, 2015, and titled "FIBER-OPTIC TEMPERATURE AND FLOW SENSOR SYSTEM AND METHODS." U.S. Provisional Application Ser. No. 62/161,730 is herein incorporated by reference in its entirety. The present application is a continuation-in-part under 35 U.S.C. § 120 of U.S. patent application Ser. No. 15/155,773, filed May 15, 2016, entitled "FIBER-OPTIC TEMPERATURE AND FLOW SENSOR SYSTEM AND METHODS," which is hereby incorporated by reference in its entirety.

FEDERALLY SPONSORED RESEARCH OR DEVELOPMENT

This invention was made with Government support under grant N00173-15-P-0376 awarded by the Naval Research Laboratory and under grants N000141410139 and N000141410456 awarded by the Office of Naval Research. The Government has certain rights in this invention.

BACKGROUND

An optical fiber can include a flexible, transparent fiber made of extruded glass (silica) or plastic. Light can be transmitted between two ends of the optical fiber, which may be used in fiber-optic communications. A fiber optic sensor uses an optical fiber either as the sensing element (e.g, an intrinsic sensor) or as a means of relaying signals from a remote sensor to electronics that process a signal within the optical fiber (e.g., an extrinsic sensor). Fiber-optic sensors, such as intrinsic sensors, utilize optical fibers to measure temperature, strain, pressure, and/or other characteristics associated with the optical fiber.

DRAWINGS

The detailed description is described with reference to the accompanying figures. The use of the same reference numbers in different instances in the description and the figures may indicate similar or identical items.

DETAILED DESCRIPTION

Measurement of speed of gas or liquid flow is of great practical importance in a variety of industries, such as food inspection, pharmacy, oil/gas exploration, environmental, high-voltage power systems, chemical plants, and oceanography research. Fiber-optic sensors (e.g., temperature sensors, flowmeters, anemometers) have proven to be attractive alternatives to their traditional mechanical or electromagnetic counterparts owing to their many unique advantages, such as small size, light weight, immunity to electromagnetic interference, remote sensing capability, harsh environment tolerance, and capability for distributed or quasi-distributed measurement.

In addition to sensitivity and temperature range, two important sensor parameters can include temperature resolution and speed (or response time). Temperature resolution, defined as the minimum detectable temperature changes, is determined by both the sensor sensitivity (defined as the sensor output from a given temperature change) and the noise of the sensor system, while the response time is mostly limited by the time constant of the heat transfer process between the sensing element and the surrounding environment. The sensing element of many fiber-optic temperature sensors is part of the fiber itself, which can be made of fused silica. The temperature resolution and the speed can be limited by the relatively low thermo-optic coefficient (TOC) and thermal diffusivity of the glass material that lead, respectively, to a reduced sensor sensitivity and increased time for the temperature of the sensing element to reach equilibrium with the surrounding environment. For example, a fiber Bragg grating (FBG), whose reflection spectrum features a single reflection peak, can exhibit a temperature sensitivity of about 10 pm/° C. A fiber modal interferometer based on a single mode-multimode-single mode fiber structure has been reported to have a temperature resolution of 0.2° C. Many all-silica-fiber-based temperature sensors possess relatively low sensitivity and relatively low temperature resolution. As to the response time, a package of a FBG with a copper tube encapsulation can greatly reduce the response time of the sensor from several seconds to 48.6 milliseconds (ms) in water. A response time of 16 ms in air has been demonstrated for a microfiber coupler tip temperature sensor.

Compared to fused silica, crystalline silicon is a much more desirable sensor material for high-resolution and high-speed temperature sensing. Silicon is highly transparent over the infrared wavelength and has a TOC approximately 10 times larger than that of fused silica used for the sensing element for most fiber-optic sensors, resulting in potentially much higher temperature sensitivity. In addition, a silicon-based temperature sensor also has high speed because of the large thermal diffusivity of silicon, which is comparable to many metals (e.g., aluminum and gold) and is more than 60 times larger than fused silica. However, the use of silicon as a temperature sensing element has not been utilized on a large scale for high-resolution and high-speed temperature sensing. The dependence of the absorption of a silicon film on temperature for temperature sensing and the sensor has shown a relatively low temperature resolution of ±0.12° C. and a long response time on the order of 1 second (s). A simpler structure with a thin silicon film (thickness <1 μm) deposited directly on the fiber end through electron-beam evaporation has shown a temperature resolution of only 3° C. In this case, radio-frequency sputtering was applied to simplify the deposition process, and the resolution was mainly limited by the small thickness of the silicon film that led to broad spectral fringes. Instead of silicon film, a silicon micro-waveguide patterned on a micro-electro-mechanical system (MEMS) was developed as temperature sensor, and due to the increased length of the Si sensing element, the temperature resolution was improved to 0.064° C. However, it is a challenge to integrate the fiber and the MEMS into a single sensor device, and the large size of previous sensing elements also limit their temperature measurement speed.

Accordingly, a fiber optic sensor, a process for utilizing a fiber optic sensor, and a process for fabricating a fiber optic sensor are described, where a double-side-polished silicon pillar is attached to an optical fiber tip and forms a Fabry-Pérot (FP) cavity and a sensor head. In an implementation, a fiber optic sensor in accordance with an exemplary embodiment includes an optical fiber configured to be coupled to a light source and a spectrometer; and a single silicon layer or multiple silicon layers disposed on an end face of the optical fiber using fusion splicing, where each of the silicon layer(s) defines a Fabry-Pérot interferometer, and where the sensor head reflects light from the light source to the spectrometer. In some implementations, the fiber optic sensor may include the light source coupled to the optical fiber; a spectrometer coupled to the optical fiber; and a controller coupled to the high-speed spectrometer. In some implementations, the fiber optic sensor may include a heating light source coupled to the optical fiber.

In an implementation, a process for utilizing a fiber optic sensor in accordance with an exemplary embodiment includes causing a light source to transmit light through an optical fiber and a circulator to a fiber optic sensor, where the fiber optic sensor includes a silicon layer that is fusion spliced to an end face of the fiber optic sensor; receiving reflected light from the fiber optic sensor using a spectrometer, the spectrometer based on a transmission grating and a diode array; and analyzing an output from the spectrometer based on received reflected light.

In an implementation, a process for fabricating a fiber optic sensor in accordance with an exemplary embodiment includes bonding a silicon pillar to a first section of cleaved optic fiber with ultraviolet-curable glue; aligning the first section of cleaved optic fiber with a second section of cleaved optic fiber; and splicing the silicon pillar to the second section of cleaved optic fiber, where the ultraviolet-curable glue thermally decomposes during splicing.

The high-speed fiber optic sensor and processes disclosed herein increase the temperature response and/or decrease the response time of the sensor. The diameter of the pillar (e.g., 80 μm or 100 μm, smaller than the optical fiber diameter) leads to a fast temperature response. The length of the pillar (e.g., ~200 μm) together with the large refractive index (RI) of the silicon material result in dense fringes in the reflection spectrum of the FP cavity. Using this unique spectral characteristic of the fiber optic sensor, the noise is significantly reduced and the measurement resolution is improved. The sensor described herein has, in one exemplary implementation, shown a high temperature resolution of $6 \times 10^{-4 \circ}$ C. and a short response time of 0.51 ms. This fiber optic sensor with a high-resolution and fast-response is especially effective in the precise and real-time characterization of temperature structure in highly dynamic optical turbulence.

Due to the small size, high temperature capability, and easy operation, the sensor/heater disclosed herein is attractive for applications in a variety of fields, such as biology, microfluidics systems, mechanical engineering, and high-temperature optical sensing. For example, the fiber optic sensor disclosed herein can be used as a micro-boiler or a micro-bubble generator. Additionally, taking advantage of the high-resolution temperature sensing of the silicon Fabry-Pérot interferometer, a heater temperature can be easily self-gauged.

Example Implementations

FIGS. 1A through 1J illustrate a fiber optic sensor 100 and fiber optic sensing system 130 in accordance with an example implementation of the present disclosure. The fiber optic sensor 100 can include an optical fiber 102 configured to be coupled to a light source 126 and a high-speed spectrometer 128. The fiber optic sensor 100 and fiber optic sensing system 130 may be utilized as a temperature sensor in determining temperature, such as in gas and/or liquid.

Figure 1A:
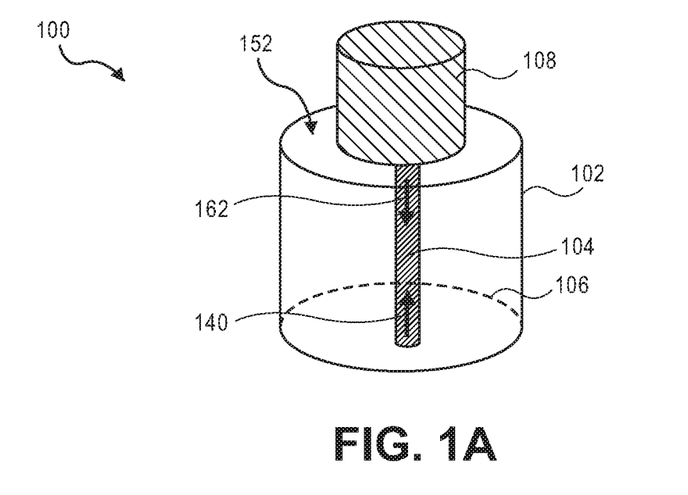
FIG. 1A is an isometric view illustrating an embodiment of a fiber optic sensor that includes a silicon layer disposed on an end face of an optical fiber, in accordance with an example implementation of the present disclosure.

In implementations, the optical fiber 102 can include a flexible, transparent fiber core 104 made of extruded glass (e.g., silica) or a polymer. The optical fiber 102 can be configured to transmit light between the two ends of the optical fiber 102. In some instances, the optical fiber 102 may be immune to electromagnetic interference.

The optical fiber 102 can include the core 104 and/or a cladding 106. The core 104 may include a fiber of glass and/or plastic that extends along the length of the optical fiber 102. The core 104 may be surrounded by the cladding 106, which may include a material with a lower index of refraction than the core 104. In embodiments, the cladding 106 may include a cladding of a different glass and/or plastic, a buffer layer, and/or a jacket.

As illustrated in FIG. 1A, the fiber optic sensor 100 can include a silicon layer 108 disposed on (e.g., adhered to, fusion spliced to) an end face 152 of the optical fiber 102 (e.g., a cleaved portion of the optical fiber 102), which forms a sensor head. In implementations, the silicon layer 108 can include a silicon pillar, a silicon-based film, and/or some other form of silicon. In a specific embodiment, the silicon layer 108 can include a double-sided polished silicon pillar. In another specific embodiment, the silicon layer 108 can include a piece of a silicon wafer bonded to the end face 152. Additionally, the silicon layer 108 may include various diameters and/or lengths. For example, the silicon layer 108 can include a silicon pillar with a diameter between about 80 μm to 100 μm with a length of about 200 μm. In another example, the silicon layer 108 may include a piece of silicon that is approximately 10 μm thick. In yet another example, the silicon layer 108 can include a piece of silicon that is approximately 200 μm thick. It is contemplated that the silicon layer 108 may include other diameters and/or lengths. In implementations, the silicon layer 108 diameter can be less than the diameter of the optical fiber 102, which can lead to a fast temperature response. The silicon in the silicon layer 108 is highly transparent over the infrared wavelength and has a TOC approximately 10 times larger than that of the silica used in the optical fiber for most fiber-optic sensors resulting in potentially much higher temperature sensitivity. In addition, the fiber optic sensor 100 also has high speed because of the large thermal diffusivity of silicon, which is comparable to many metals (e.g., aluminum and gold) and more than 60 times larger than fused silica. In other implementations, the silicon layer 108 may be replaced with other materials that have large thermal diffusivity and high thermo-optic and thermal expansion coefficients. Further, it is contemplated that the silicon layer 108 can include other configurations, such as a cuboid configuration.

Figure 1B:
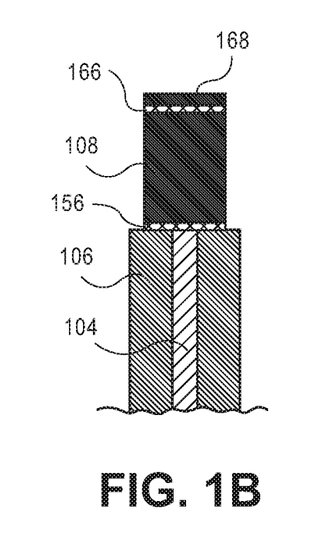
FIG. 1B is a partial side elevation cross section view illustrating an embodiment of a fiber optic sensor that includes multiple cascaded silicon layers disposed on an end face of an optical fiber, where the silicon layers are coupled to the optical fiber using an adhesive, in accordance with an example implementation of the present disclosure.
Figure 1C:
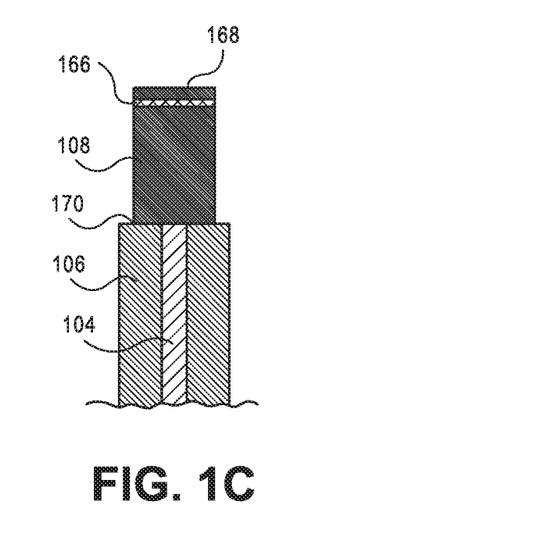
FIG. 1C is a partial side elevation cross section view illustrating an embodiment of a fiber optic sensor that includes multiple cascaded silicon layers disposed on an end face of an optical fiber, where the silicon layers are coupled to the optical fiber using fusion splicing, in accordance with an example implementation of the present disclosure.
Figure 1D:
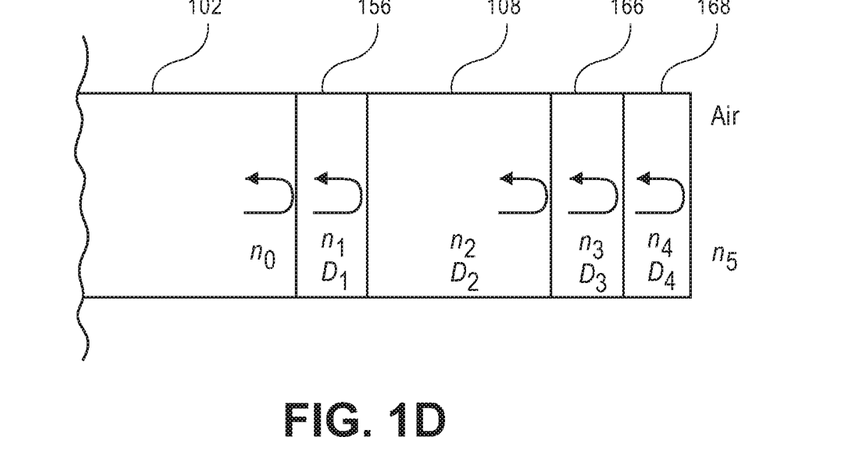
FIG. 1D is a partial side elevation cross section view illustrating an embodiment of a fiber optic sensor that includes multiple cascaded silicon layers disposed on an end face of an optical fiber, in accordance with an example implementation of the present disclosure.

As illustrated in FIGS. 1B through 1D, the fiber optic sensor 100 may include cascaded Fabry-Pérot cavities. In the implementation shown in FIG. 1B, the fiber optic sensor 100 may include an adhesive 156 disposed on an end face 152 of the optical fiber 102, a silicon layer 108 disposed on an end face 152 of an optical fiber 102 (e.g., using adhesive 156), a second adhesive 166 disposed on the silicon layer 108, and a second silicon layer 168 disposed on the second adhesive 166. In the implementation shown in FIG. 1C, the fiber optic sensor 100 may include a silicon layer 108 that is disposed (e.g., fusion spliced) on/to an end face 152 of an optical fiber 102, and/or a second silicon layer 168 disposed on the first silicon layer 108. The silicon layer 108 and/or the second silicon layer 168 can include the same and/or a similar material (e.g., silicon) so that each has the same responsivity to temperature. In this way, the large free spectrum range (FSR) of the envelope originating from the second silicon layer 168 (a second Fabry-Pérot interferometer) provides large dynamic range, while the recognized dense fringes with small FSR stemming from the silicon layer 108 (a first Fabry-Pérot interferometer) offers high resolution due to the narrow fringes. When used, the adhesive 156 and/or the second adhesive 166 can include materials suitable to bond the optical fiber 102, the silicon layer 108, and/or the second silicon layer 168 (e.g., a UV glue, etc.). Additionally, the adhesive 156 and/or the second adhesive 166 can be the same or similar diameter as the silicon layer 108 and/or second silicon layer 168, while the thickness of the adhesive 156 and/or the second adhesive 166 can be only a few microns (e.g., <1 μm, 2 μm, 3 μm, etc.). Because the adhesive 156 and/or the second adhesive 166 are very thin compared to the silicon layer 108 and the second silicon layer 168, they show negligible influence on the reflection spectrum of reflected light 162. In specific embodiments, the silicon layer 108 and the second silicon layer 168 can be the same or similar diameters but have different lengths (e.g., the silicon layer 108 is 200 μm in length and the second silicon layer 168 is 10 μm in length). It is contemplated that the silicon layer 108 and/or the second silicon layer 168 can include a variety of lengths and/or diameters. In FIG. 1D, $n_i$ and $D_i$ represent the refractive index and separation of the $i^{th}$ layer, respectively. These implementations provide an optical fiber thermometer based on double cascaded Fabry-Pérot interferometers both made from the same material of silicon but with different cavity lengths to achieve both large dynamic and high resolution.

In implementations, the fiber optic sensor 100 defines and includes a Fabry-Pérot (FP) cavity. A Fabry-Pérot cavity (or Fabry-Pérot interferometer) can include a cavity formed by the optical fiber 102 and the silicon layer 108 disposed on the end face 152 of the optical fiber 102. Due to the thermo-optic effect, temperature variations change the optical thickness of the FP cavity and consequently cause spectral shifts in its reflection spectrum.

Figure 1E:
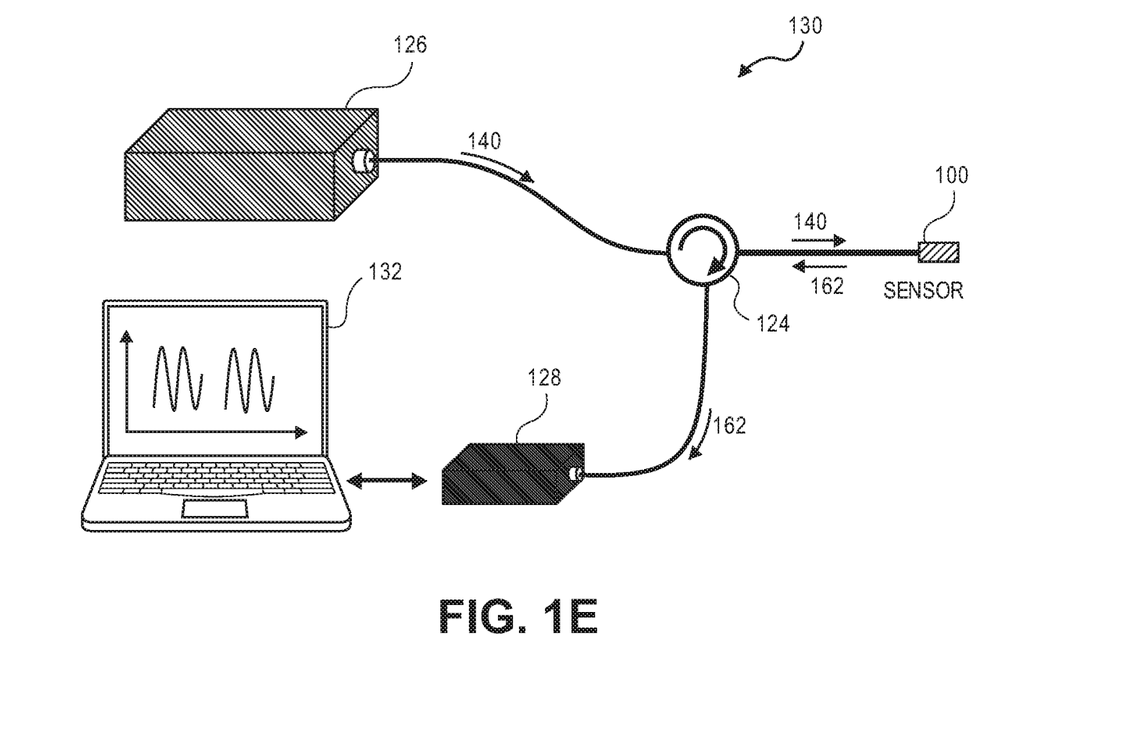
FIG. 1E is an environmental view illustrating an embodiment of a fiber optic sensing system that includes a fiber optic sensor with a silicon layer disposed on an end face of an optical fiber, in accordance with an example implementation of the present disclosure.

As illustrated in FIG. 1E, the fiber optic sensing system 130 can include the fiber optic sensor 100, a light source 126, a circulator 124, a spectrometer 128, and a controller 132. In some implementations, the fiber optic sensing system 130 may include a heating light source 146.

In implementations, the light source 126 (e.g., a broad band source) transmits light to the circulator 124 and the fiber optic sensor 100. In one specific embodiment, light source 126 includes a wavelength swept laser, such as a high-speed, narrow-linewidth, and wavelength-swept laser. In another specific embodiment, light source 126 includes a laser diode. In yet another specific embodiment, light source 126 includes a white light source (e.g., 1550 nm). It is contemplated that the light source 126 can include other types of light sources. In implementations, the light source 126 is optically coupled to the optical fiber 102, which is optically coupled to the circulator 124. Additionally, the light source 126 can be coupled to and controlled using controller 132.

Figure 1F:
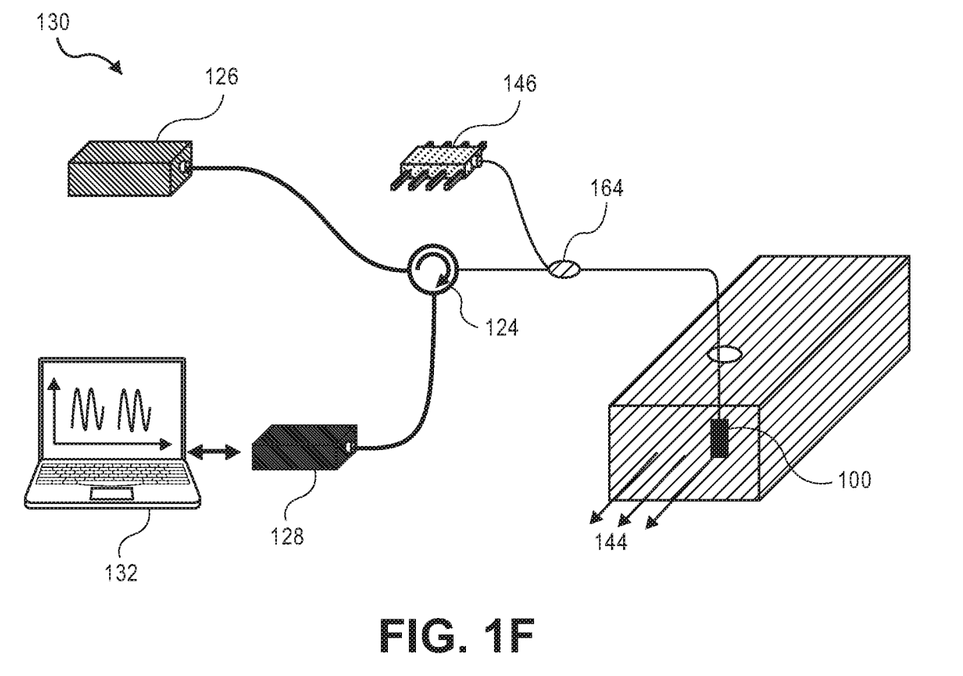
FIG. 1F is an environmental view illustrating an embodiment of a fiber optic sensing system that includes a fiber optic sensor with a silicon layer disposed on an end face of an optical fiber, in accordance with an example implementation of the present disclosure.

As illustrated in FIG. 1F, the fiber optic sensing system 130 may include a heating light source 146 configured to provide heating light 142. In these embodiments, the heating light source 146 can include a light source, such as a red laser diode, that is optically coupled to the optical fiber 102 using a coupler 164. In one specific instance, the heating light source 146 can include a 635 nm diode laser. The heating light source 146 may include other light sources that provide light, which can be absorbed by the fiber optic sensor 100 and/or the silicon layer 108. Additionally, the heating light source 146 can be controlled using controller 132.

A circulator 124 can include a fiber-optic component used to separate optical signals in optical fiber 102. In implementations, circulator 124 can direct transmitted light 140 from light source 126 (and/or heating light 142 from heating light source 146) to fiber optic sensor 100 while directing reflected light 162 from the fiber optic sensor 100 to spectrometer 128.

The fiber optic sensing system 130 can include a spectrometer 128 coupled to the optical fiber 102 and a controller 132. In implementations, the spectrometer 128 can include a light sensor, such as a photodetector, configured to detect reflected light 162 and the associated spectra from the optical fiber 102 and fiber optic sensor 100. In a specific embodiment, the spectrometer 128 may include a high-speed photodetector (e.g., the high-speed spectrometer from Ibsen Photonics, I-MON 256 USB, Denmark). Additionally, the spectrometer 128 can be coupled to and controlled using controller 132.

As reflected light 162 is received and/or detected by spectrometer 128, a shift in wavelength is detected when temperature changes at the silicon layer 108. The wavelength of the $N^{th}$ fringe peak, $\lambda_N$, of the reflection spectrum is given as $$\left(N + \frac{1}{2}\right)\lambda_N = 2 \, nL \qquad \text{Eq. 1}$$

where n and L are, respectively, the RI and cavity length of the FP cavity. Both n and L are dependent on temperature due to the thermo-optic effect and the thermal expansion of the silicon material. Therefore, temperature change can be measured by monitoring $\lambda_N$. From Eq. 1, the temperature sensitivity is given by $$\frac{\partial \lambda_N}{\partial T} = \lambda_N \left(\frac{1}{n}\frac{\partial n}{\partial T} + \frac{1}{L}\frac{\partial L}{\partial T}\right) \qquad \text{Eq. 2}$$

Although Eqs. 1 and 2 only depict one of the multiple peaks in the reflected spectrum from the sensor, in some cases, an average wavelength may be applied to significantly reduce the noise lever or increase the resolution. This average wavelength can be obtained from multiple peaks or valleys or both.

The sensitivity depends on the TOC and the thermo-expansion coefficient (TEC) of the sensing material. The TOC and TEC for silicon are, respectively, $1.5 \times 10^{-4}$ RIU/° C. and $2.55 \times 10^{-6}$ m/(m·° C.) at 25° C. To estimate the sensitivity, these values are applied to Eq. (2) at the peak wavelength $A_N$ around 1550 nm and the RI of silicon is assumed to be 3.4. From this, the sensitivity of the temperature sensor proposed here is estimated to be 72 pm/° C. As a comparison to the all-fiber based sensor, the TOC and TEC for fused silica are, respectively, $1.28 \times 10^{-5}$ RIU/° C. and $5.5 \times 10^{-7}$ m/(m·° C.) at 25° C., both of which are much smaller than those for silicon. Assuming the RI of silica at 1550 nm is 1.5, the sensitivity of an all-fiber based sensor is about 14 pm/° C., which is more than 5 times smaller than the fiber optic sensor 100.

The high RI (about 3.4) of silicon over infrared wavelength range produces a high reflectivity at the interfaces between silicon layer 108 and the surrounding environment and between silicon layer 108 and the fiber end face 152, which facilitates to obtain a large optical power and a high fringe-visibility of the interferometric spectrum from the FP cavity for improving the sensor resolution. In addition, the high RI and the relatively long FP cavity yield a large number of fringes within the wavelength range of the spectrometer, which can be exploited to further increase the temperature resolution.

The fiber optic sensor 100 also features a short response time. Due to the high thermal diffusivity of silicon and the small size of the sensor head, the temperature within the FP cavity can quickly reach equilibrium with surroundings.

Figure 1G:
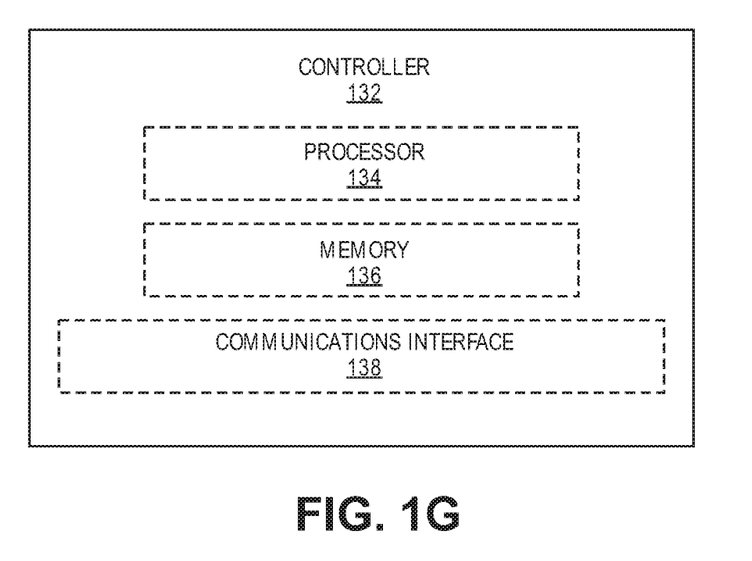
FIG. 1G is an environmental view illustrating an embodiment of a controller used in a fiber optic sensing system, in accordance with an example implementation of the present disclosure.

As illustrated in FIGS. 1F and 1G, the fiber optic sensing system 130 can include a controller 132 that is configured to determine a shift in spectra detected by spectrometer 128 using a fiber optic sensor 100. The controller 132 can be coupled to the components of the fiber optic sensing system 130. Additionally, the controller 132 may be configured in a variety of ways. As illustrated in FIG. 1G, the controller 132 is illustrated as including a processor 134, a memory 136, and a communications interface 138. The processor 134 provides processing functionality for the fiber optic sensor 100 and may include any number of processors, microcontrollers, or other processing systems, and resident or external memory for storing data and other information accessed or generated by the fiber optic sensor 100. The processor 134 may execute one or more software programs that implement the techniques and modules described herein. The processor 134 is not limited by the materials from which it is formed or the processing mechanisms employed therein and, as such, may be implemented via semiconductor(s) and/or transistors (e.g., electronic integrated circuits (ICs)), and so forth.

The memory 136 is an example of a non-transitory computer storage device that provides storage functionality to store various data associated with the operation of the fiber optic sensor 100, such as the software program and code segments mentioned above, computer instructions, and/or other data to instruct the processor 134 and other elements of the fiber optic sensor 100 to perform the techniques described herein. Although a single memory 136 is shown, a wide variety of types and combinations of memory may be employed. The memory 136 may be integral with the processor 134, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The communications interface 138 is operatively configured to communicate with components of the fiber optic sensor 100. For example, the communications interface 138 can be configured to transmit data for storage in the controller 132, retrieve data from storage in the controller 132, and so forth. The communications interface 138 is also communicatively coupled with the processor 134 to facilitate data transfer between components of the fiber optic sensing system 130 and the processor 134 (e.g., for communicating inputs to the processor 134 received from a device communicatively coupled with the fiber optic sensing system 130). It should be noted that while the communications interface 138 is described as a component of fiber optic sensing system 130, one or more components of the communications interface 138 can be implemented as external components communicatively coupled to the fiber optic sensing system 130 via a wired and/or wireless connection. The fiber optic sensing system 130 can also comprise and/or connect to one or more input/output (I/O) devices (e.g., via the communications interface 138) including, but not necessarily limited to, a display, a mouse, a touchpad, a keyboard, and so on.

The communications interface 138 and/or the processor 134 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 138 can be configured to communicate with a single network or multiple networks across different access points.

Figure 1H:
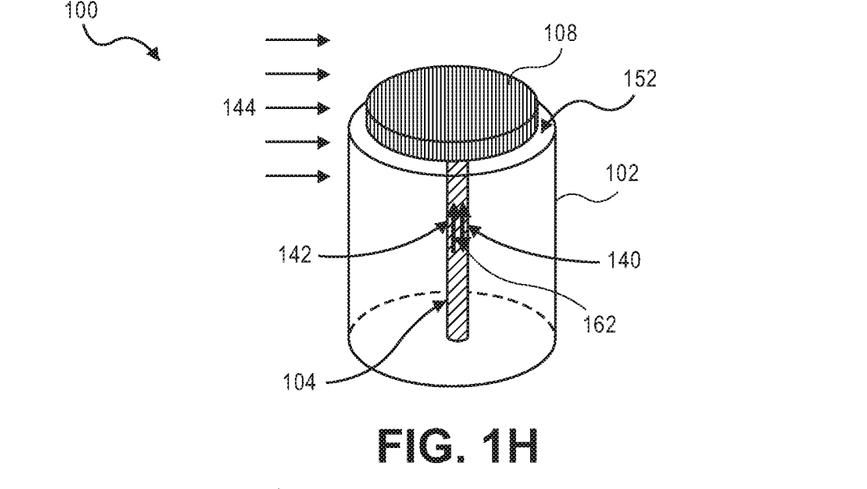
FIG. 1H is an isometric view illustrating an embodiment of a fiber optic sensor that includes a silicon layer disposed on an end face of an optical fiber, in accordance with an example implementation of the present disclosure.
Figure 1I:
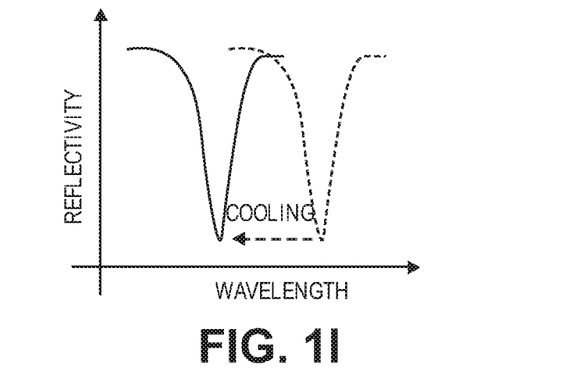
FIG. 1I is a graphical depiction illustrating a wavelength shift that represents a temperature change using a fiber optic sensor that includes a silicon layer disposed on an end face of an optical fiber, in accordance with an example implementation of the present disclosure.
Figure 1J:
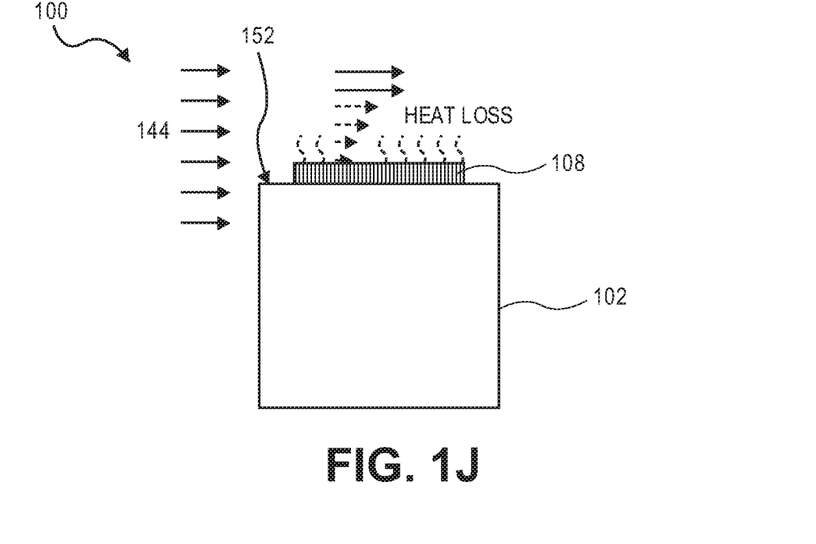
FIG. 1J is a side elevation cross sectional view illustrating an embodiment of a fiber optic sensor that includes a silicon layer disposed on an end face of an optical fiber, in accordance with an example implementation of the present disclosure.

In one specific embodiment illustrated in FIGS. 1H through 1J, the fiber optic sensor 100 can function as a fiber optic anemometer. In this embodiment, the transmitted light 140 (e.g., white-light centered at 1550 nm) is injected through the optical fiber 102 to the FP defined in the fiber optic sensor 100 by the optical fiber 102 and the silicon layer 108, and the reflection spectrum of the reflected light 162 can be recorded by a high-speed spectrometer 128. At the same time, heating light 142 from a heating light source 146 (e.g., 635 nm diode laser) can be guided through the same optical fiber 102 to the heat the FP. Silicon has a band gap energy of 1.11 eV and is highly transparent to the transmitted light 140 but is opaque to the heating light 142. Therefore, the FP temperature can be effectively increased by the heating light 142. When air moves (e.g., air convection 144) over the surface of a hot silicon layer 108, a cooling effect from the moving air reduces the temperature of the silicon layer 108 and the FP and introduces a shift to the fringe valley wavelength of the reflection spectrum, as schematically shown in FIGS. 1H and 1I. The wavelength shift can be separated by the spectrometer 128 and/or the controller 132 into a wind-temperature-induced wavelength shift and a wind-speed-induced wavelength shift. As a result, temperature self-compensated measurement of wind speed can be achieved by comparing the shift in the wavelengths of a fringe valley when the heating laser is turned on and off to determine temperature-compensated wind speed. It should be pointed out that although it is implemented as an anemometer in this example, it is not limited to measuring only the wind or air flow. Any other kind of flows (e.g., water flow) that can bring about the cooling effects to the heated sensor head can be measured.

Example Processes

Figure 2A:
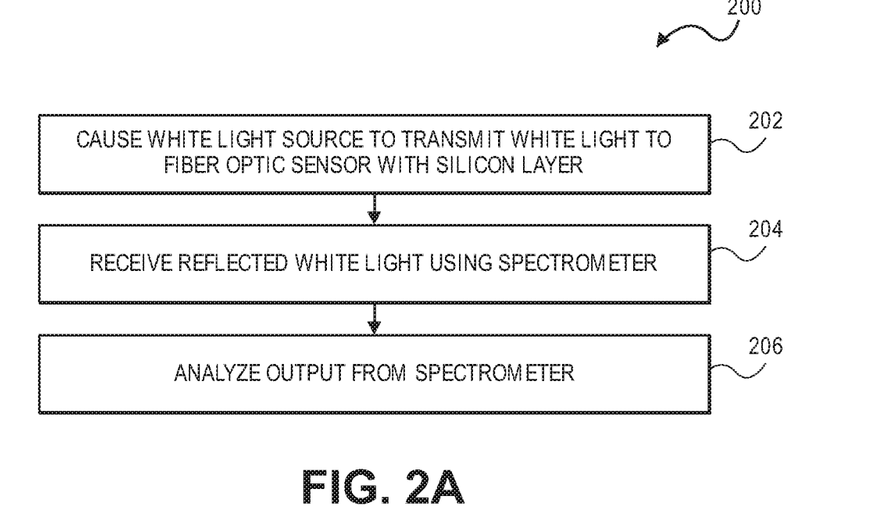
FIG. 2A is a flow diagram illustrating an example process for using a fiber optic sensor that includes a silicon layer disposed on an end face of an optical fiber, such as the fiber optic sensor illustrated in FIGS. 1A through 1G.

The following discussion describes example techniques for utilizing a fiber optic sensor and fiber optic sensing system, such as the fiber optic sensor 100 and fiber optic sensing system 130 described in FIGS. 1A through 1J. FIG. 2A depicts an example process 200 for using the fiber optic sensor 100.

As shown in FIG. 2A, a light source is caused to transmit light through a fiber optic to a fiber optic sensor (Block 202). In this implementation, controller 132 can cause light source 126 to transmit light (e.g., transmitted light 140) through optical fiber 102 and circulator 124 to fiber optic sensor 100. Controller 132 can control the duration and intensity that the light source 126 transmits the transmitted light 140. In some specific implementations, controller 132 can cause heating light source 146 to transmit heating light 142 through the optical fiber 102 to the fiber optic sensor 100 and the silicon layer 108 for providing heat, where the silicon layer 108 can be coupled to the optical fiber 102 using an adhesive 156 and/or using fusion splicing.

Reflected light from the fiber optic sensor is received using a spectrometer (Block 204). The spectrometer 128 can receive the reflected light 162 and associated spectra, which can be recorded and/or analyzed by spectrometer 128 and/or controller 132.

An output from the spectrometer is analyzed based on the received reflected light (Block 206). In implementations, the controller 132 and/or the spectrometer 128 can analyze the reflected light 162 and the spectra to determine a wavelength shift in the spectra, which indicates a change in temperature. A variety of methods may be utilized to analyze and/or determine the wavelength shift in the spectra and for tracking the average wavelength. In a specific embodiment, analyzing an output from the spectrometer based on received reflected light can include using an average wavelength tracking method to further increase the resolution of wavelength and/or measurand.

Figure 2B:
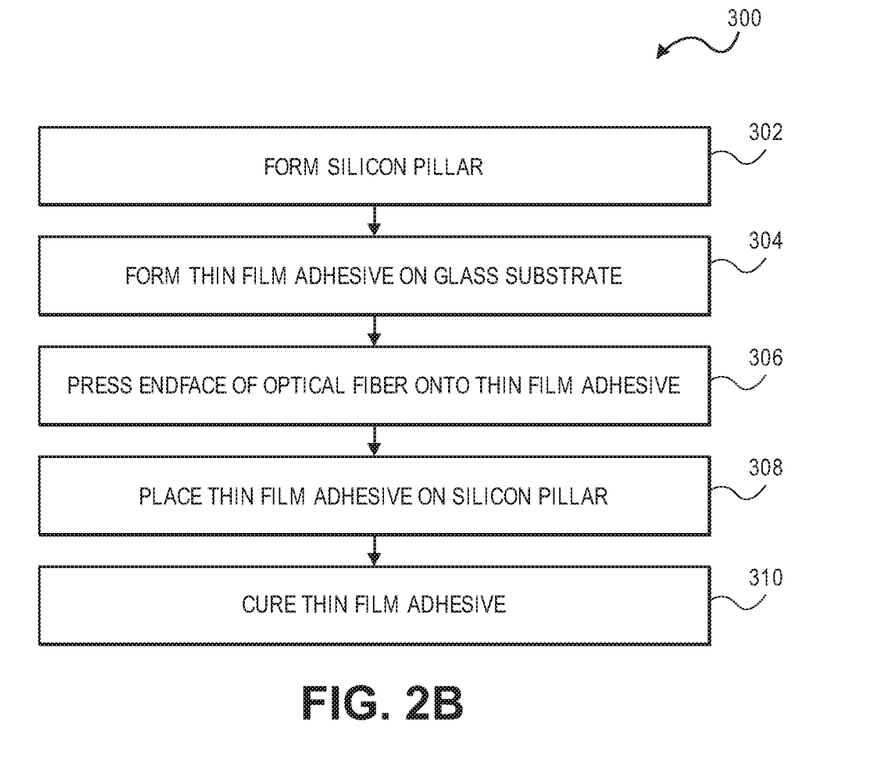
FIG. 2B is a flow diagram illustrating an example process for fabricating a fiber optic sensor that includes a silicon layer disposed on an end face of an optical fiber, such as the fiber optic sensor illustrated in FIGS. 1A through 1G.

The following discussion describes example techniques for fabricating a fiber optic sensor, such as the fiber optic sensor 100 described in FIGS. 1A through 1J. FIG. 2B depicts an example process 300 for fabricating the fiber optic sensor 100. FIGS. 3A through 3E illustrate a section an exemplary fiber optic sensor 100 during fabrication using an adhesive (such as the fiber optic sensors 100 described in FIGS. 1A through 1I).

Figure 3A:
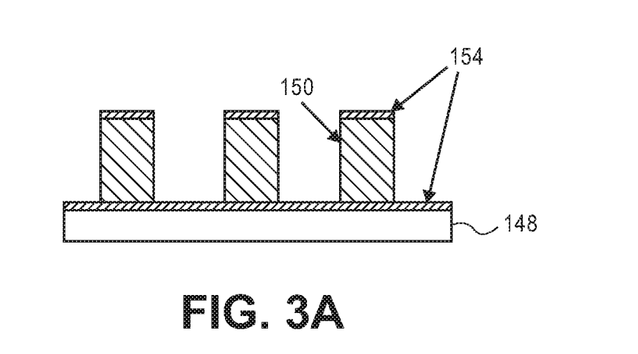
FIG. 3A is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1G, in accordance with the process shown in FIG. 2B.
Figure 3B:
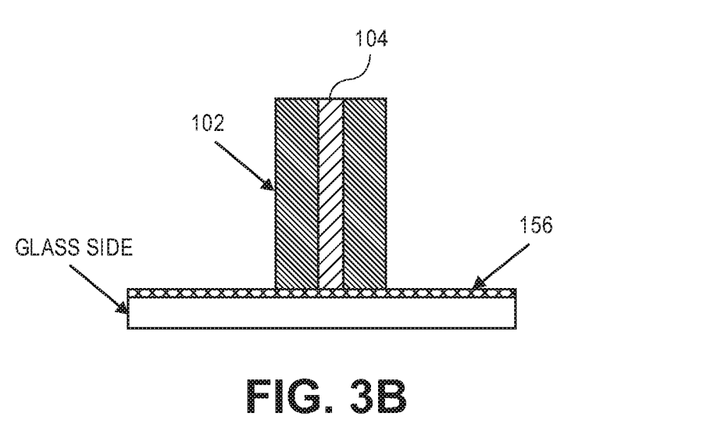
FIG. 3B is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1G, in accordance with the process shown in FIG. 2B.

As shown in FIG. 2B, a silicon pillar is formed on a silicon substrate (Block 302). FIG. 3A illustrates forming at least one silicon pillar 150 that will function as a sensor head for the fiber optic sensor 100. In one specific implementation, a double-side-polished silicon wafer (e.g., 200 μm thick) can be bonded on top of another larger silicon wafer using a layer of photoresist 154. The larger silicon wafer can function as a silicon substrate 148 to facilitate the fabrication and later as a support for the fabricated silicon pillar 150. Then another layer of photoresist 154 can be coated on the top of the double-side-polished silicon wafer and patterned accordingly using photolithography techniques. The patterned top silicon layer can be etched all the way to the silicon substrate 148 and the second layer of photoresist 154 using, for example, deep-reactive-ion-etching, leaving the upstanding silicon pillar(s) 150 attached to the silicon substrate 148.

Then, a thin film adhesive is formed on a glass substrate (Block 304). In some specific embodiments, such as the one illustrated in FIG. 3B, an adhesive 156 including a thin film of UV-curable glue can be spin-coated on a piece of glass substrate 158. It is contemplated that forming a thin film adhesive 156 may include using other adhesives and/or other methods for depositing and/or forming the adhesive 156. In embodiments, the adhesive 156 may include a thin film adhesive (e.g., UV-curable glue, an epoxy-based adhesive, and/or a gel-based adhesive).

Figure 3C:
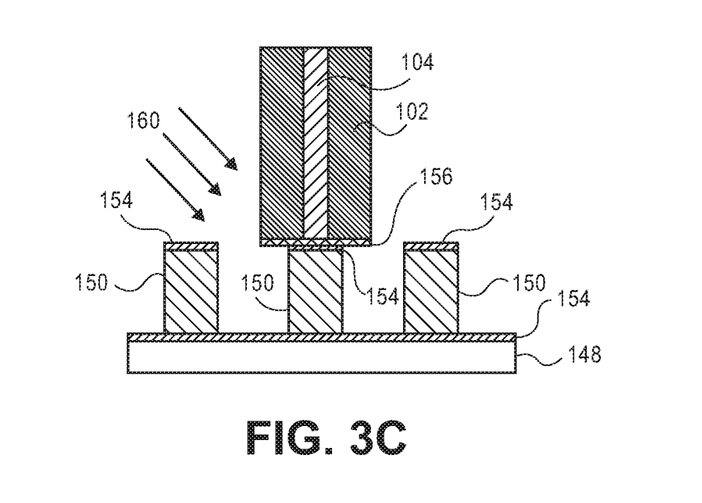
FIG. 3C is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1G, in accordance with the process shown in FIG. 2B.

As shown in FIG. 3C, an end face of an optical fiber is pressed onto the thin film adhesive (Block 306). In implementations, the adhesive 156 can be transferred to a cleaved and cleaned end face 152 of an optical fiber 102 by pressing the end face 152 of the optical fiber 102 to the adhesive 156 on the glass substrate 158. Subsequently, the end face 152 and the adhesive 156 can be released from the glass substrate 158.

Figure 3D:
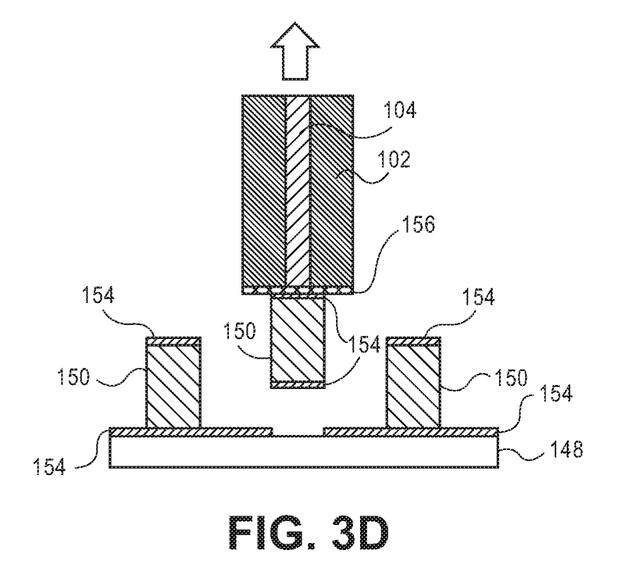
FIG. 3D is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1G, in accordance with the process shown in FIG. 2B.
Figure 3E:
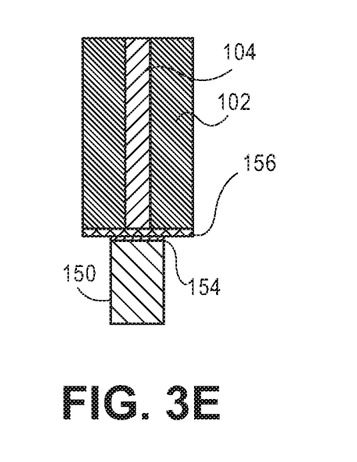
FIG. 3E is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1G, in accordance with the process shown in FIG. 2B.

As illustrated in FIGS. 3D and 3E, the optical thin film adhesive on the end face is placed onto the silicon pillar to provide the fiber optic sensor (Block 308). The optical fiber 102 with the silicon pillar 150 (silicon layer 108) attached can be lifted from the silicon substrate 148 and the second layer of photoresist 154. Further, fabrication of the fiber optic sensor 100 may include cleaning residual photoresist 154 from the end of the silicon pillar 150 (e.g., with alcohol). Due to the ultra-thin thickness of the residual photoresist 154 between the optical fiber 102 and the silicon pillar 150/silicon layer 108, the reflection spectrum of the FP cavity within the fiber optic sensor 100 is not affected.

Then, the thin film adhesive is cured (Block 310). In implementations, the adhesive 156 can be cured, for example, by UV irradiation (e.g., UV light 160). It is contemplated that other bonding technology may be implemented to mount the silicon layer 108 (or other material) to the end face 152 of the optical fiber 102, such as physical contact bonding.

It is contemplated that the above steps may be repeated to form a fiber optic sensor 100 with cascaded Fabry-Pérot cavities. For example, the optical fiber 102 with the silicon pillar 150 may be further pressed onto a second adhesive 166 on a glass substrate, placed on a second silicon pillar (e.g., second silicon layer 168), and cured using UV light, to form a fiber optic sensor 100 with two Fabry-Pérot interferometers. Further Fabry-Pérot interferometers may be fabricated by repeating the above steps.

Figure 4:
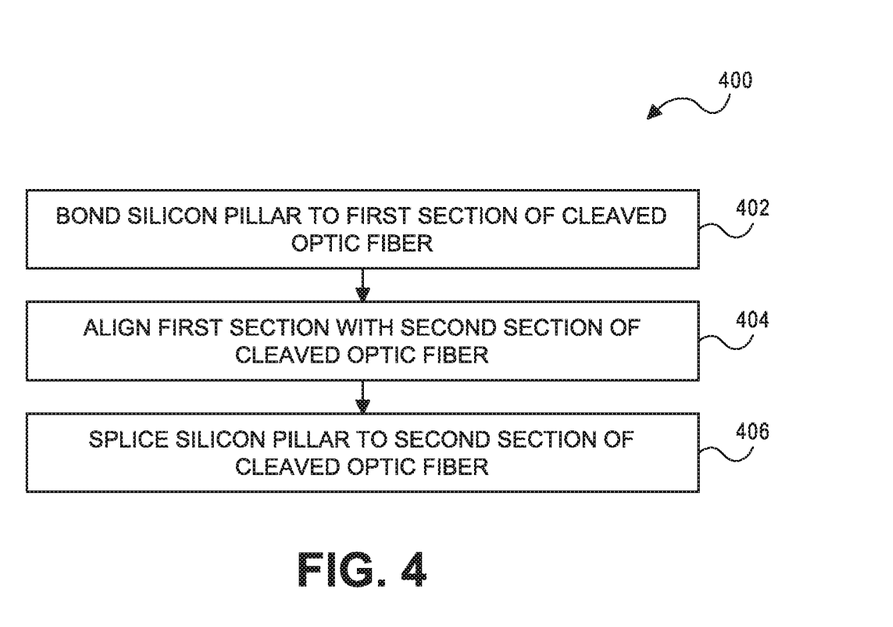
FIG. 4 is a flow diagram illustrating an example process for fabricating a fiber optic sensor that includes a silicon layer disposed on an end face of an optical fiber using fusion splicing, such as the fiber optic sensor illustrated in FIGS. 1A through 1J.
Figure 5A:
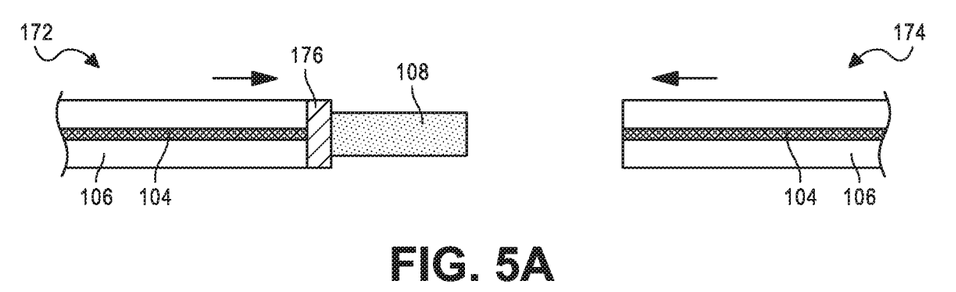
FIG. 5A is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1J, in accordance with the process shown in FIG. 4.
Figure 5B:
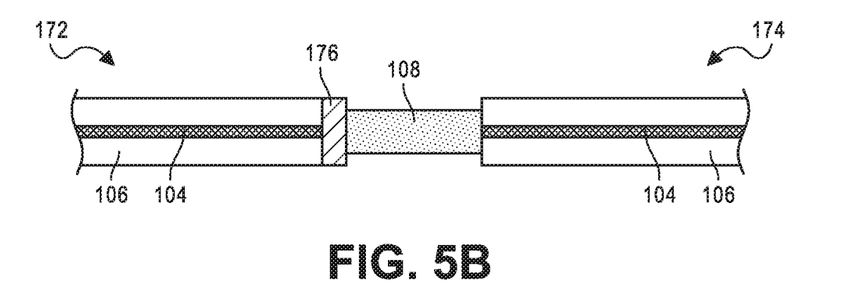
FIG. 5B is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1J, in accordance with the process shown in FIG. 4.
Figure 5C:
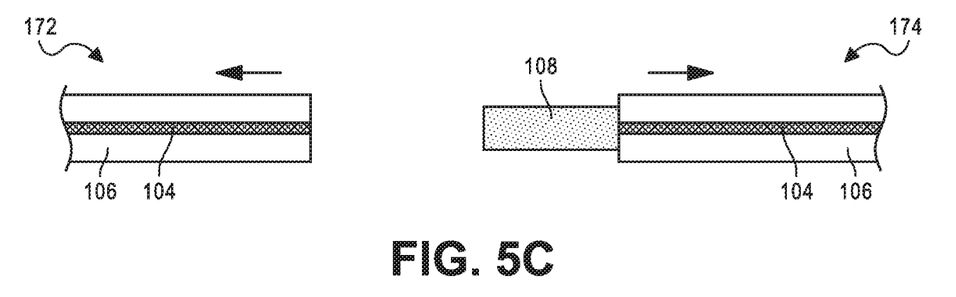
FIG. 5C is a diagrammatic partial cross-sectional side elevation view illustrating the fabrication of a fiber optic sensor that includes a silicon layer disposed on an end face of an optical fiber, such as the fiber optic sensor illustrated in FIGS. 1A through 1J, in accordance with the process shown in FIG. 4.

The following discussion describes example techniques for fabricating a fiber optic sensor, such as the fiber optic sensor 100 described in FIGS. 1A through 1J. FIG. 4 depicts an example process 300 for fabricating the fiber optic sensor 100. FIGS. 5A through 5C illustrate a section an exemplary fiber optic sensor 100 (such as the fiber optic sensors 100 described in FIGS. 1A through 1J) during fabrication using fusion splicing.

As shown in FIG. 5A, a silicon pillar is bonded to a first section of a cleaved optic fiber (Block 402). FIG. 5A illustrates bonding at least one silicon layer 108 (e.g., silicon pillar) that can function as a sensor head for a fiber optic sensor 100. In one specific implementation, a silicon pillar can be bonded to a first section 172 of a cleaved optic fiber using an adhesive 176 (e.g., ultraviolet (UV) curable glue). The adhesive 176 and/or UV curable glue may be configured to decompose when exposed to a hot arc in a subsequent fusion process step. It is contemplated that the silicon layer 108 can include a variety of forms, such as a pillar and/or a cuboid. Bonding the at least one silicon layer 108 to the first section 172 may be performed using, for example, automated equipment such as pick-and-place equipment or a fusion splicer.

Then, the first section of the cleaved optic fiber and the silicon pillar are aligned with a second section of a cleaved optic fiber (Block 404). As shown in FIG. 5B, the first section 172 of the cleaved optic fiber can be aligned with a second section 174 of the cleaved optic fiber and moved close to each other using automated machinery, such as a fusion splicer.

As shown in FIG. 5C, the silicon pillar can be spliced to the second section of the cleaved optic fiber (Block 406). In this implementation, the silicon pillar can be spliced to the second section 174 of the cleaved optic fiber, for example using a manual mode of a fusion splicer. Fusion splicing can include the process of fusing and/or welding two components together using, for example, an electric arc. During splicing, an arc power and arc duration may be selected such that the silicon pillar is coupled/fused to the end of the second section of cleaved optic fiber to form a spliced surface 170. During this splicing step, the adhesive 176 can be thermally decomposed by way of the hot arc. As a result of the adhesive 176 decomposition, the first section 172 of the cleaved optic fiber can be separated from the silicon pillar, and the silicon pillar can be fusion spliced to the second section 174 of the cleaved optic fiber to form a micro-heater, which can be used with elevated temperatures (e.g., >1000° C.). This type of micro-heater may be advantageous because micro-heaters using UV glue may be limited to use with temperatures less than 100° C.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A fiber-optic sensor, comprising:
an optical fiber configured to be coupled to a light source and a spectrometer; and
a first silicon layer fusion spliced to an end face of the optical fiber, where the first silicon layer defines a Fabry-Pérot interferometer and a sensor head, where the sensor head reflects light from the light source to the spectrometer;
wherein the first silicon layer comprises a double sided-polished silicon pillar having a smaller diameter than a diameter of the optical fiber.

2. The fiber-optic sensor of claim 1, wherein the optical fiber includes a silica single mode fiber.

3. The fiber-optic sensor of claim 1, wherein the optical fiber includes a circulator.

4. The fiber-optic micro-heater of claim 1, wherein the double sided-polished silicon pillar is less than approximately 200 μm in length.

5. The fiber-optic sensor of claim 1, wherein the double sided-polished silicon pillar has a diameter less than approximately 100 μm.

6. The fiber-optic sensor of claim 1, further comprising:
the light source coupled to the optical fiber;
the spectrometer coupled to the optical fiber; and
a controller coupled to the spectrometer.

7. The fiber-optic sensor of claim 6, wherein the spectrometer is based on a transmission grating and a diode array operating in the 1550 nm wavelength window.

8. A fiber-optic sensor, comprising:
an optical fiber configured to be coupled to a light source and a spectrometer; and
a first silicon layer fusion spliced to an end face of the optical fiber, where the first silicon layer defines a Fabry-Pérot interferometer and a sensor head, where the sensor head reflects light from the light source to the spectrometer;
further comprising:
a second silicon layer disposed on the first silicon layer, where a first silicon layer length is different from a second silicon layer length.

9. A fiber-optic micro-heater comprising:
an optical fiber configured to be coupled to a light source and a spectrometer;
a first silicon layer fusion spliced to an end face of the optical fiber, where the first silicon layer defines a Fabry-Pérot interferometer and a sensor head, where the sensor head reflects light from the light source to the spectrometer; and
a heating light source coupled to the optical fiber;
wherein the first silicon layer comprises a double sided-polished silicon pillar having a smaller diameter than a diameter of the optical fiber.

10. The fiber-optic micro-heater of claim 9, wherein the heating light source includes a short wavelength diode laser.

11. A process for utilizing a fiber-optic sensor, comprising:
causing a light source to transmit light through an optical fiber to a fiber-optic micro-heater, where the fiber-optic micro-heater includes a silicon layer that is fusion spliced to an end face of the fiber-optic micro-heater, where the first silicon layer defines a Fabry-Pérot interferometer and a sensor head, and wherein the first silicon layer comprises a double sided-polished silicon pillar having a smaller diameter than a diameter of the optical fiber;
receiving reflected light from the fiber-optic micro-heater using a spectrometer, the spectrometer based on a transmission grating and a diode array; and
analyzing an output from the spectrometer based on received reflected light.

12. The process for utilizing the fiber optic sensor in claim 11, wherein the fiber optic sensor includes a Fabry-Pérot interferometer.

13. The process for utilizing the fiber optic sensor in claim 11, wherein receiving returned white light using the spectrometer includes recording a reflection spectrum of the reflected white light.

14. The process for utilizing the fiber optic sensor in claim 11, wherein analyzing an output from the spectrometer includes using an average wavelength tracking method.

15. The process for utilizing the fiber optic sensor in claim 11, further comprising:
heating the silicon layer using a heating light source guided by the optical fiber.

16. A process for fabricating a fiber-optic sensor, comprising:
bonding a silicon pillar to a first section of cleaved optic fiber with ultraviolet-curable glue;
aligning the first section of cleaved optic fiber with a second section of cleaved optic fiber; and splicing the silicon pillar to the second section of cleaved optic fiber, where the ultraviolet-curable glue thermally decomposes during splicing.

17. The process for fabricating the fiber optic sensor in claim 16, wherein the at least one silicon pillar is approximately 80 μm in diameter and approximately 200 μm in length.

18. The process for fabricating the fiber optic sensor in claim 16, wherein the at least one silicon pillar includes a metal coating disposed on an end face of the at least one silicon pillar that is distal from the optical fiber.

19. The process for fabricating the fiber optic sensor in claim 16, wherein splicing the silicon pillar to the second section of cleaved optic fiber includes fusion splicing the silicon pillar to the second section of cleaved optic fiber.

* * * * *

UNITED STATES PATENT AND TRADEMARK OFFICE
CERTIFICATE OF CORRECTION

PATENT NO. : 10,520,355 B1
APPLICATION NO. : 15/919326
DATED : December 31, 2019
INVENTOR(S) : Ming Han et al.

It is certified that error appears in the above-identified patent and that said Letters Patent is hereby corrected as shown below:

In the Specification

In Column 1, remove the paragraph beginning on Line 23 and replace it with the following:
This invention was made with Government support under grants N00173-15-P-0376 and N00173-15-P-3755 awarded by the Naval Research Laboratory and under grants N00014-14-1-0139 and N00014-14-1-0456 awarded by the Office of Naval Research. The Government has certain rights in this invention.

Signed and Sealed this
Twenty-ninth Day of December, 2020

Andrei Iancu
*Director of the United States Patent and Trademark Office*